US007782605B2

(12) United States Patent
Wu et al.

(10) Patent No.: US 7,782,605 B2
(45) Date of Patent: Aug. 24, 2010

(54) DRIVE BRACKET ASSEMBLY

(75) Inventors: Chia-Kang Wu, Taipei Hsien (TW);
Li-Ping Chen, Taipei Hsien (TW);
Chieh Yang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 367 days.

(21) Appl. No.: 11/565,655

(22) Filed: Dec. 1, 2006

(65) Prior Publication Data
US 2008/0128569 A1    Jun. 5, 2008

(51) Int. Cl.
G06F 1/16      (2006.01)
H05K 5/00     (2006.01)
H05K 7/00     (2006.01)

(52) U.S. Cl. .................. 361/679.39; 361/679.33; 361/679.37; 312/223.1; 312/223.2; 312/333

(58) Field of Classification Search .......... 248/200, 248/300, 225.21, 247; 211/26, 72, 84; 369/75.11–82; 361/379, 683, 685, 724, 679.33, 679.37, 361/679.39; 312/223.1, 223.2, 333
See application file for complete search history.

(56) References Cited

U.S. PATENT DOCUMENTS

| | | | |
|---|---|---|---|
| 4,964,017 A * | 10/1990 | Jindrick et al. ............ | 361/683 |
| 5,340,340 A * | 8/1994 | Hastings et al. ............ | 439/64 |
| 5,601,349 A * | 2/1997 | Holt ........................ | 312/265.6 |
| 5,896,273 A * | 4/1999 | Varghese et al. .......... | 361/724 |
| 5,902,025 A * | 5/1999 | Yu .......................... | 312/109 |
| 5,917,696 A * | 6/1999 | Peng ........................ | 361/686 |
| 6,234,592 B1 * | 5/2001 | Liu et al. ................. | 312/223.2 |
| 6,272,008 B1 * | 8/2001 | Huang ...................... | 361/683 |
| 6,288,332 B1 * | 9/2001 | Liu et al. ................. | 174/542 |
| 6,445,663 B1 * | 9/2002 | Chen et al. ................ | 720/652 |
| 6,944,013 B2 * | 9/2005 | Yang ........................ | 361/683 |
| 6,944,016 B2 * | 9/2005 | Chen et al. ................ | 361/685 |
| 7,027,306 B2 * | 4/2006 | Chen et al. ................ | 361/725 |
| 7,061,755 B2 * | 6/2006 | Lin et al. .................. | 361/683 |

(Continued)

FOREIGN PATENT DOCUMENTS

CN     2862599 Y  * 12/2005

(Continued)

*Primary Examiner*—J. Allen Shriver, II
*Assistant Examiner*—Michael McDuffie
(74) *Attorney, Agent, or Firm*—Wei Te Chung

(57) ABSTRACT

A drive bracket assembly includes a drive bracket and a back panel. The drive bracket includes a first side plate and a second side plate with a securing post. The securing post includes a thin shank portion and a thick head portion. The back panel has a first edge and a second edge, and defines a locking hole corresponding to the securing post. The locking hole has an inserting hole and a restricting hole. In assembly, the securing post inserts into the inserting hole of the back panel with the head portion passing through the inserting hole and the shank portion received in the inserting hole. The back panel moves to have the first edge resisting against the first side plate. The shank portion of the securing post moves into the restricting hole to sandwich the back panel between the head portion of the securing post and the second side plate.

17 Claims, 5 Drawing Sheets

U.S. PATENT DOCUMENTS

| | | | |
|---|---|---|---|
| 7,142,431 B2 * | 11/2006 | Li et al. | 361/726 |
| 7,264,321 B1 * | 9/2007 | Bueley et al. | 312/265.5 |
| 2003/0223192 A1 * | 12/2003 | Searby et al. | 361/683 |
| 2004/0085719 A1 * | 5/2004 | Huang | 361/683 |
| 2004/0095717 A1 * | 5/2004 | Hsu et al. | 361/685 |
| 2005/0036280 A1 * | 2/2005 | Lai | 361/683 |
| 2005/0088813 A1 * | 4/2005 | Chen et al. | 361/683 |
| 2005/0099764 A1 * | 5/2005 | Chen et al. | 361/679 |
| 2005/0280982 A1 * | 12/2005 | Yang | 361/684 |
| 2007/0025068 A1 * | 2/2007 | Chen et al. | 361/679 |
| 2007/0144983 A1 * | 6/2007 | Fan et al. | 211/26 |

FOREIGN PATENT DOCUMENTS

TW        093202852        12/2004

* cited by examiner

DRIVE BRACKET ASSEMBLY

BACKGROUND

1. Field of the Invention

The present invention relates to drive bracket assemblies, and more particularly to a drive bracket assembly with a back panel mounted thereon.

2. Description of Related Art

Generally, a plurality of large data storage devices is needed in a server system. It is well known that the server system isn't switched off when the data storage devices are serviced or replaced. The data storage devices are detached and installed from/to the server system while the server system remains on line. The data storage devices are accommodated in a drive bracket with a back panel attached thereon. The data storage devices can electrically connect with the back panel when installed in the drive bracket.

In a drive bracket, a locking plate is provided to hold the back panel. The drive bracket includes a pair of side walls and a bottom wall. A plurality of posts is respectively disposed on the side walls and the bottom wall. The locking plate has two bent clips formed on opposite edges, and a bottom clip formed on a bottom edge. Two guiding slots and a through hole are defined in each bent clip, and two through holes are defined in the bottom clip. In assembly, the back panel together with the locking plate is inserted in the drive bracket between the side walls. The posts of the side walls of the drive bracket are slid into the guiding slots of the bent clips of the locking plate, and the posts of the bottom wall are inserted into the through holes of the bottom clip. Numerous fasteners are respectively engaged with the posts of the bottom wall of the drive bracket, and engaged in the through holes of the bent clips, thereby fixing the back panel and the locking clip into the drive bracket. However, the mounting apparatus has a complicated structure, and the manufacturing cost is high.

What is needed, therefore, is a drive bracket assembly for securing a back panel thereon with a simple structure.

SUMMARY OF THE INVENTION

A drive bracket assembly includes a drive bracket and a back panel. The drive bracket includes a first side plate and a second side plate with a securing post. The securing post includes a thin shank portion and a thick head portion. The back panel has a first edge and a second edge, and defines a locking hole corresponding to the securing post. The locking hole has an inserting hole and a restricting hole. In assembly, the securing post inserts into the inserting hole of the back panel with the head portion passing through the inserting hole and the shank portion received in the inserting hole. The back panel moves to have the first edge resisting against the first side plate. The shank portion of the securing post moves into the restricting hole to sandwich the back panel between the head portion of the securing post and the second side plate.

Other advantages and novel features will be drawn from the following detailed description of preferred embodiments with attached drawings, in which:

DETAILED DESCRIPTION OF THE INVENTION

Figure 1:
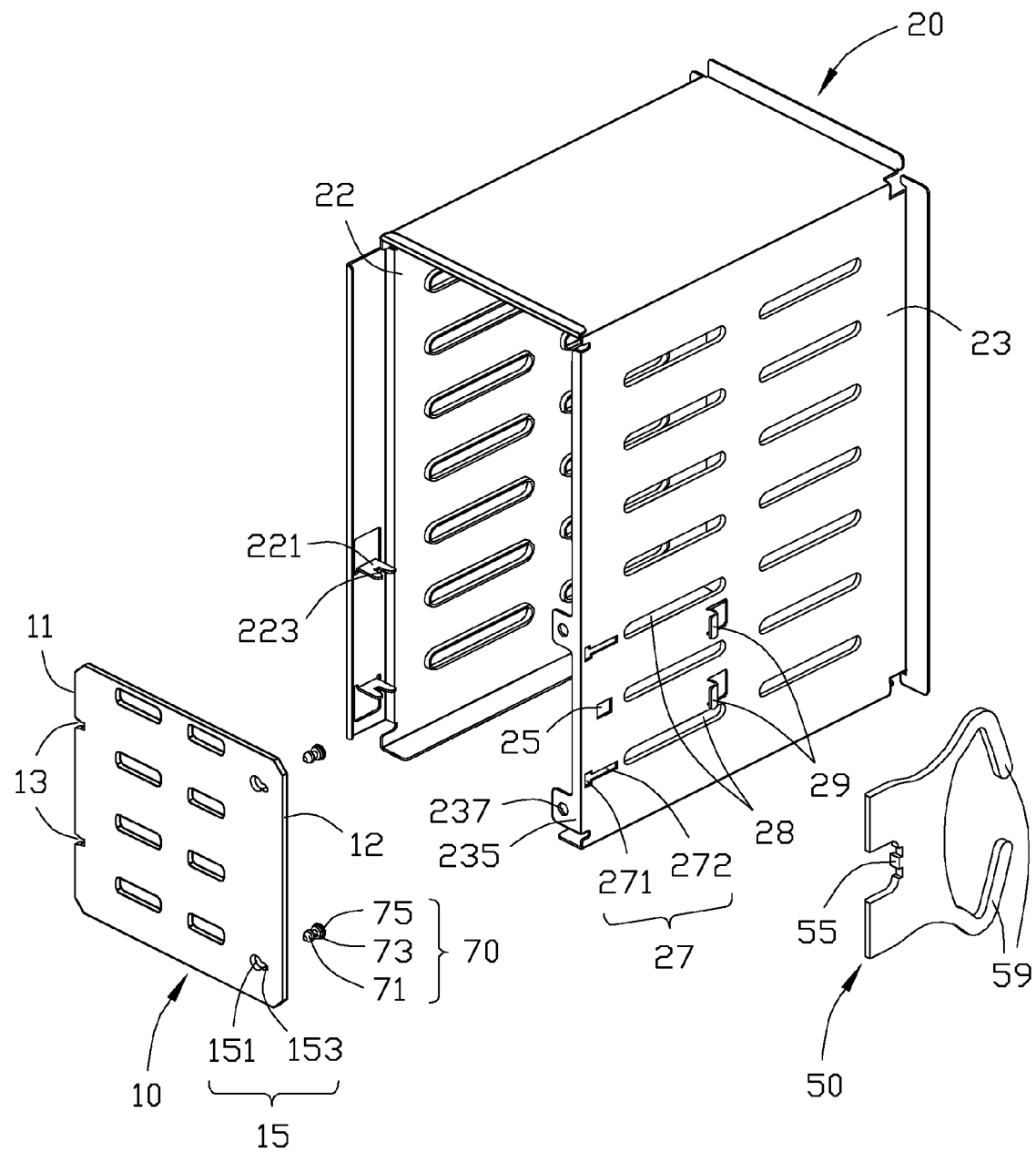
FIG. 1 is an exploded isometric view of a drive bracket assembly in accordance with a preferred embodiment of the present invention including a drive bracket, a back panel, and a stopping member.

Referring to FIG. 1, a drive bracket assembly in accordance with a preferred embodiment of the present invention includes a drive bracket 20, a back panel 10, and a stopping member 50.

The drive bracket 20 includes a first side plate 22, and a second side plate 23 parallel to the first side plate 22. The first side plate 22 forms a pair of horizontal supporting pieces 221 on a rear portion thereof. The supporting pieces 221 extend toward the second side plate 23. Each of the supporting pieces 221 defines a cutout 223 therein to divide the supporting piece 221 into two parts. A rear edge of the second side plate 23 is bent towards the first side plate 22 to form a pair of vertical bent pieces 235. Each of the bent pieces 235 defines a securing hole 237 therein. The second side plate 23 defines a pair of sliding grooves 27. Each of the sliding grooves 27 includes a wide portion 271 and a narrow portion 272. The wide portion 271 is located nearer to the rear edge of the second side plate 23 than the narrow portion 272. The second side plate 23 defines an opening 25 between the pair of sliding grooves 27. A pair of guiding grooves 28 is defined in the second side plate 23 following but not communicated with the pair of sliding grooves 27. A pair of stopping pieces 29 is formed on the second side plate 23 between the pair of guiding grooves 28.

The back panel 10 is generally a square panel, whose thickness is equal to a width of the cutout 223. The back panel 10 includes a pair of vertical and parallel first and second edges 11 and 12. The first edge 11 defines a pair of cutouts 13 corresponding to the pair of supporting pieces 221 of the first side plate 22. A width of the cutout 13 is equal to a thickness of the supporting piece 212. The back panel 10 defines a pair of locking holes 15 corresponding to the pair of securing holes 237 of the second side plate 23. Each of the locking holes 15 includes a large inserting hole 151 and a small restricting hole 153 communicating with the inserting hole 151. The inserting hole 151 and the restricting hole 153 are horizontally aligned, and the restricting hole 153 is located nearer to the second edge 12 than the inserting hole 151.

A pair of securing posts 70 are configured to be mounted in the pair of securing holes 237 respectively. Each of the securing posts 70 includes a shank portion 73, a head portion 71 formed on one end of the shank portion 73, and a base portion 75 formed on the other end of the shank portion 73. A diameter of the head portion 71 is larger than a diameter of the shank portion 73. The diameter of the head portion 71 is smaller than a diameter of the inserting hole 151, and larger than a diameter of the restricting hole 153. The diameter of the shank portion 71 is smaller than the diameter of the restricting hole 153. A length of the shank portion 73 is equal to a thickness of the back panel 10.

Figure 2:
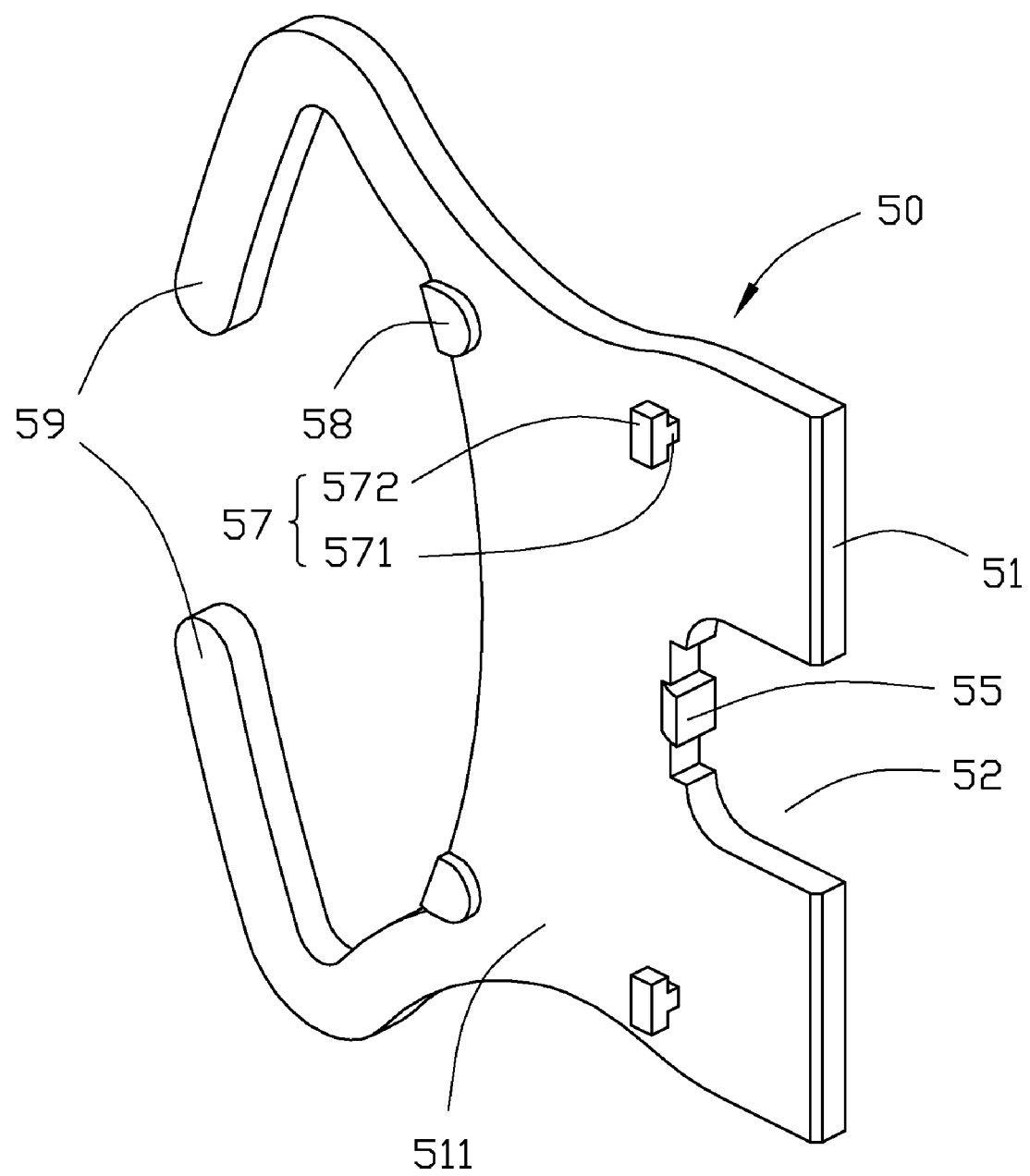
FIG. 2 is an isometric view of the stopping member of FIG. 1.

Referring to FIGS. 1 and 2, the stopping member 50 is configured to be slidably attached on an outer surface of the second side plate 23. The stopping member 50 includes a main body 51 and a pair of resilient legs 59 extending from the main body 51. The main body 51 includes a contacting surface 511 configured to contact with the outer surface of the second side plate 23 when the stopping member 50 is attached on the second side plate 23. A pair of sliding blocks 57 is protruded from the contacting surface 511 corresponding to the pair of sliding grooves 27 of the second side plate 23. Each of the sliding blocks 57 is a "T"-shaped block, and includes a small sliding portion 571 connected with the main body 51, and a large restricting portion 572 formed on a free end of the sliding portion 571. A dimension of the restricting portion 572 is smaller than a width of the wide portion 271 of the sliding groove 27, and larger than a width of the narrow portion 272 of the sliding groove 27. A dimension of the sliding portion 571 is smaller than the width of the narrow portion 272. A length of the sliding portion 571 is equal to a thickness of the second side plate 23. A pair of guiding blocks 58 is protruded from the contacting surface 511 corresponding to the pair of guiding grooves 28 of the second side plate 23. The main body 51 defines a recess 52 at a rear side thereof. A protrusion 55 is formed on the main body 51 beside the recess 52, and extends over the contacting surface 511.

Figure 3:
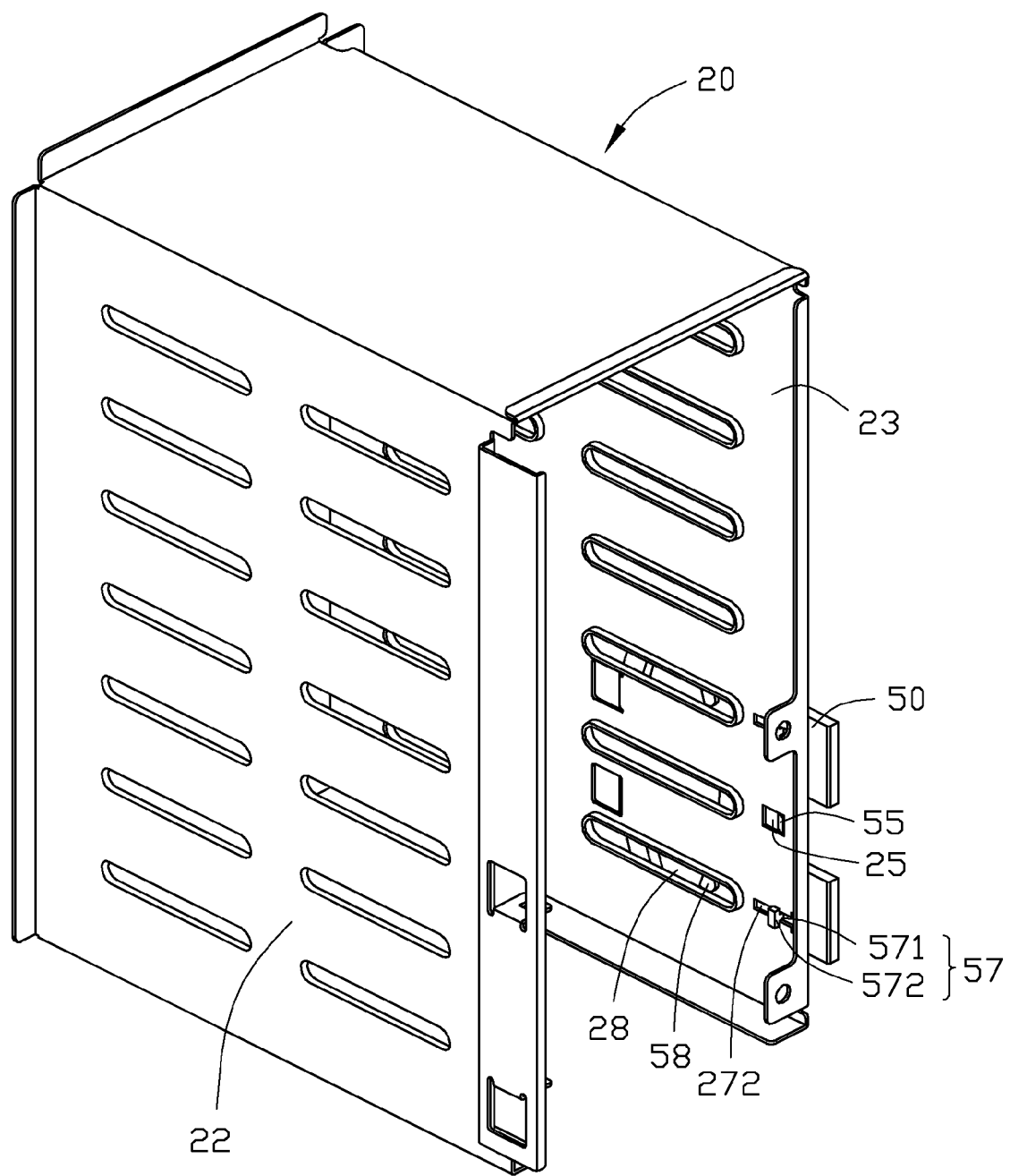
FIG. 3 is an assembly view of the stopping member attached on the drive bracket of FIG. 1, which is viewed from another aspect.

Referring to FIGS. 1 and 3, in assembly, the stopping member 50 is moved towards the second side plate 23. Each of the sliding blocks 57 passes through the corresponding wide portions 271 of the sliding grooves 27, and each of the guiding blocks 58 is received in the corresponding guiding grooves 28. The protrusion 55 resists against the outer surface of the second side plate 23. Then, the stopping member 50 slides forward along the second side plate 23. The sliding portion 571 of the sliding block 57 slides into the narrow portion 272 of the sliding groove. The restricting portion 572 abuts against an inner surface of the second side plate 23 to prevent the stopping member 50 from being disassembled from the second side plate 23. Simultaneously, free ends of the resilient legs 59 of the stopping member 50 resist against the stopping pieces 29 of the second side plate 23 to resiliently deform the legs 59. The stopping member 50 slides further forwardly until the protrusion 55 is aligned with the opening 25 of the second side plate 23. The protrusion 55 is inserted in the opening 25, and the contacting surface 511 contacts with the outer surface of the second side plate 23. The protrusion 55 is received in the opening 25 with the protrusion 55 resisting against a rear edge of the opening 25 by the elastic force of the legs 59. A rear portion of the main body 51 is located behind the rear edge of the second side plate 23. So the stopping member 50 is slidably attached on the second side plate 23.

Figure 4:
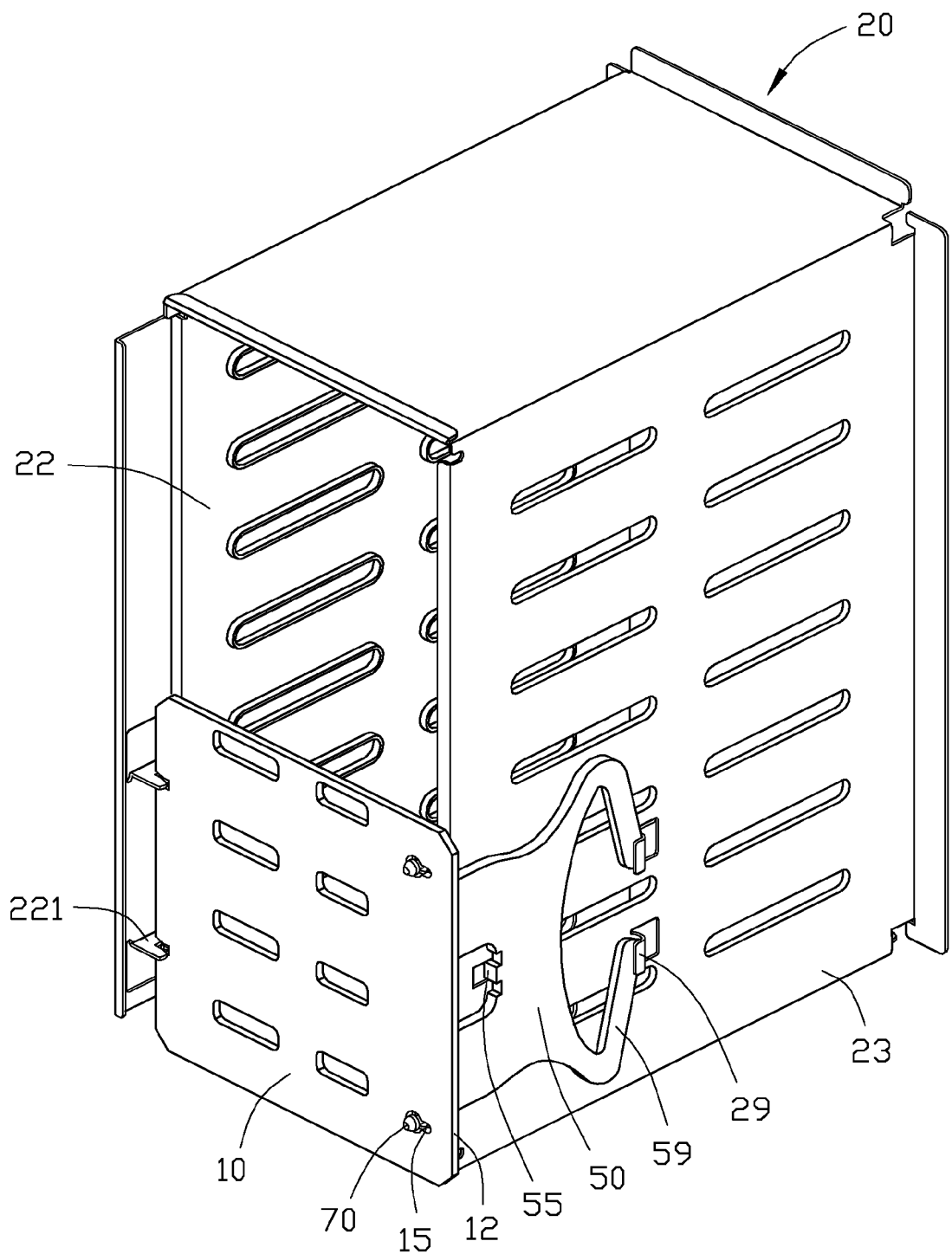
FIG. 4 is a pre-assembled view of the back panel and the drive bracket of FIG. 1.
Figure 5:
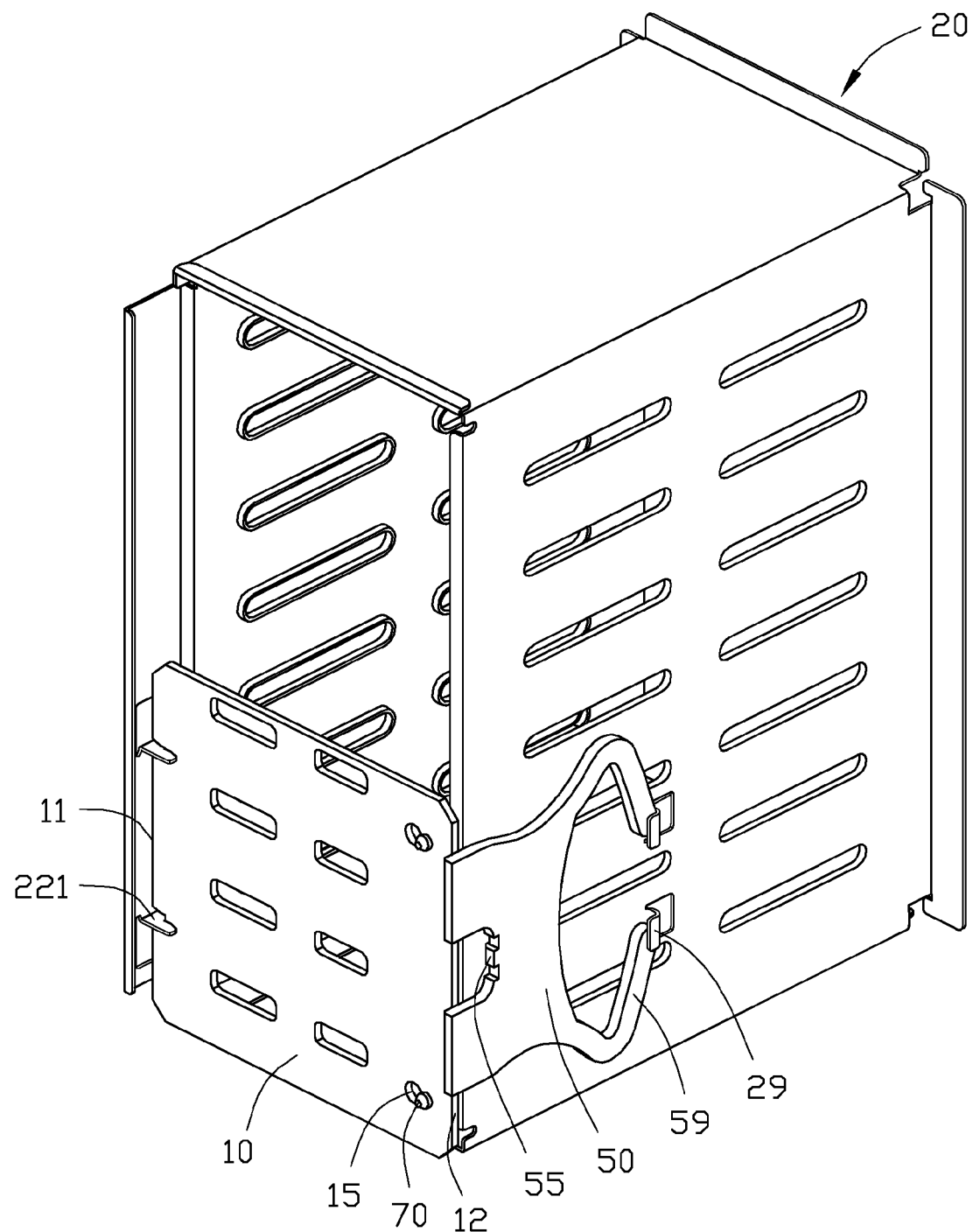
FIG. 5 is an assembled view of the back panel secured on the drive bracket of FIG. 1.

Referring to FIGS. 1, 4, and 5, each of the securing posts 70 is mounted on the drive bracket 20 with the bases 75 secured in the corresponding securing holes 237.

The back panel 10 is moved towards a rear of the drive bracket 20 with each of the inserting holes 151 aligned with the corresponding securing post 70. The head portions 71 of the securing posts 70 pass through the inserting holes 151 of the locking holes 15 with the shank portions 73 received in the inserting holes 151. The back panel 10 urges a rear edge of the main body 51 to pull the stopping member 50 to slide forward. The back panel 10 moves until the back panel 10 resists against the bent pieces 235 of the second side plate 23. At that moment, the legs 59 of the stopping member 50 are elastic deformed, and each of the cutouts 13 of the back panel 10 is aligned face to face with each of the cutouts 223 of the first side plate 22 respectively.

The back panel 10 is then moved towards the first side plate 22 until part of the first edge 11 that defines the cutouts 13 resists against edges of the supporting pieces 221 that define the cutout 223. The shank portions 73 slide from the inserting holes 151 to the restricting holes 153. The back panel 10 is sandwiched between the head portions 71 of the securing posts 70 and the bent piece 235. The back panel 10 slides into the cutouts 223 of the supporting pieces 221 to prevent the back panel 10 from moving front and back. The supporting pieces 221 insert into the cutouts 13 of the back panel 10 to prevent the back panel 10 from sliding up and down. The back panel 10 no longer resists the stopping member 50. The stopping member 50 slides backwards by the elastic force of the legs 59 to resist against the second edge 12 of the back panel 10 to prevent the back panel 10 from moving left and right. The back panel 10 is thus mounted on the drive bracket 20. The stopping member 50 can be moved forward to thereby release the back panel 10 to allow the back panel 10 being removable from the drive bracket 20.

In the above embodiment, the stopping member 50 can be slidably attached on the back panel by other resilient members, such as springs.

It is to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A drive bracket assembly, comprising:
  a drive bracket comprising a first side plate and a second side plate, the second side plate having a securing post extending along a first direction, the securing post comprising a thin shank portion and a thick head portion formed on a free end of the shank portion;
  a back panel comprising a first edge and a second edge, the back panel defining a locking hole corresponding to the securing post, the locking hole having an inserting hole and a restricting hole communicating with the inserting hole, the inserting hole and the restricting hole aligned along a second direction different from the first direction, the restricting hole being located farther away from the first edge than the inserting hole, a diameter of the inserting hole being larger than a diameter of the head portion, a diameter of the restricting hole being smaller than a diameter of the head portion and larger than a diameter of the shank portion;
  wherein the securing post is capable of inserting into the inserting hole of the back panel in the first direction with the head portion passing through the inserting hole and the shank portion received in the inserting hole, and the back panel is capable of moving in the second direction to have the first edge resisting against the first side plate and the shank portion of the securing post entering into the restricting hole from the inserting hole to sandwich the back panel between the head portion of the securing post and the second side plate.

2. The drive bracket assembly as described in claim 1, further comprising a stopping member slidably attached on the second side plate to resist against the second edge of the back panel in the second direction for preventing the back panel withdrawing from the drive bracket in the second direction.

3. The drive bracket assembly as described in claim 2, wherein the stopping member comprises a resilient leg resisting against a stopping piece of the second side plate to keep the stopping member in an original position at which the stopping member resists against the second edge of the back panel.

4. The drive bracket assembly as described in claim 3, wherein the second side plate defines an opening, the stopping member has a protrusion received in the opening in a manner such that when the protrusion resists against an edge of the opening, the stopping member is located at the original position.

5. The drive bracket assembly as described in claim 2, wherein the stopping member is attached on one side of the second side plate, the second side plate defines a sliding groove which has a wide portion and a narrow portion, the stopping member comprises a sliding block, the sliding block has a large restricting portion being passable through the wide portion of the sliding groove, and a small sliding portion being slidable in the narrow portion with the restricting portion abutting against the other side of the second side plate to attach the stopping member on the second side plate.

6. The drive bracket assembly as described in claim 1, wherein the back panel defines a cutout on the first edge, the first side plate forms a supporting piece inserted into the cutout of the back panel to keep the back panel from moving in a third direction different form the first and second directions.

7. The drive bracket assembly as described in claim 6, wherein the supporting piece defines a cutout receiving the first edge of the back panel to prevent the back panel from moving in the first direction.

8. The drive bracket assembly as described in claim 7, wherein a width of the cutout of the supporting piece is equal to a thickness of the back panel.

9. A drive bracket assembly, comprising:
a back panel comprising a first edge and a second edge; and
a drive bracket comprising a first side plate and a second side plate, the first side plate resisting against the first edge of the back panel, and a stopping member slidably attached on the second side plate to resist against the second edge of the back panel to sandwich the back panel between the first side plate and the stopping member, the stopping member comprises a resilient leg; wherein when the resilient leg resists against a stopping piece of the second side plate, the resilient leg is resiliently deformed by the stopping piece and causes the stopping member to abut against the second edge of the back panel.

10. The drive bracket assembly as described in claim 9, wherein the second side plate defines an opening, the stopping member has a protrusion received in the opening in a manner such that when the protrusion resists against an edge of the opening, the stopping member is located at the original position.

11. The drive bracket assembly as described in claim 9, wherein the stopping member is attached on one side of the second side plate, the second side plate defines a sliding groove which has a wide portion and a narrow portion, the stopping member comprises a sliding block, the sliding block has a large restricting portion adapted to pass through the wide portion of the sliding groove, and a small sliding portion adapted to slide in the narrow portion with the restricting portion abutting against the other side of the second side plate to attach the stopping member on the second side plate.

12. The drive bracket assembly as described in claim 9, wherein the back panel defines a cutout on the first edge, the first side plate forms a supporting piece inserted into the cutout of the back panel.

13. The drive bracket assembly as described in claim 12, wherein the supporting piece defines a cutout receiving the first edge of the back panel.

14. The drive bracket assembly as described in claim 13, wherein a width of the cutout of the supporting piece is equal to a thickness of the back panel.

15. The drive bracket assembly as described in claim 9, wherein the back panel defines a locking hole which has an inserting hole and a restricting hole communicating with the inserting hole, the second side plate comprises a securing post, the securing post has a thick head portion passable through the inserting hole, and a thin shank portion slidable into the restricting hole to sandwich the back panel between the head portion and the second side plate.

16. A drive bracket assembly comprising:
a drive bracket comprising a first side plate and a second side plate cooperating to form therebetween a space configured to receive data storage devices therein;
a back panel slidably attached to one end of the drive bracket for covering at least one portion of the space;
a locking mechanism located between the drive bracket and the back panel in a manner such that the back panel is capable of sliding toward the drive bracket in a front-and-back direction and then sliding relative to the drive bracket in a left-and-right direction; and
a stopping member attached on the drive bracket to releasably resist against the back panel for preventing the back panel withdrawing from the drive bracket in the left-and-right direction, wherein the first side plate forms a supporting piece defining a slot facing the second side plate, the back panel defines a cutout on one edge thereof to allow one portion of the supporting piece passing through the cutout when the back panel is moved toward the drive bracket, the slot being configured to receive said edge of the back panel when the back panel slides relative to the drive bracket in the left-and-right direction.

17. The drive bracket assembly as described in claim 16, wherein the stopping member is slidably attached to the second side plate and is provided by the second side plate with an elastic force to keep the stopping member resisting against the back panel toward the first side plate for preventing the back panel withdrawing from the drive bracket in the left-and-right direction.

* * * * *